United States Patent
Wang et al.

(10) Patent No.: US 9,201,535 B2
(45) Date of Patent: Dec. 1, 2015

(54) COLOR FILTER SUBSTRATE AND MANUFACTURING METHOD THEREOF, DISPLAY DEVICE WITH TOUCH FUNCTION AND DRIVING METHOD THEREOF

(71) Applicant: BEIJING BOE OPTOELECTRONICS TECHNOLOGY CO., LTD., Beijing (CN)

(72) Inventors: Haisheng Wang, Beijing (CN); Junwei Wu, Beijing (CN); Xiaoliang Ding, Beijing (CN); Yingming Liu, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 69 days.

(21) Appl. No.: 14/066,921

(22) Filed: Oct. 30, 2013

(65) Prior Publication Data
US 2014/0118283 A1    May 1, 2014

(30) Foreign Application Priority Data
Oct. 31, 2012    (CN) .......................... 2012 1 0429474

(51) Int. Cl.
*G06F 3/041*    (2006.01)

(52) U.S. Cl.
CPC ............ *G06F 3/0412* (2013.01); *G06F 3/0416* (2013.01); *G06F 2203/04103* (2013.01)

(58) Field of Classification Search
CPC ..... G06F 3/041; G06F 3/0412; G06F 3/0416; G06F 2203/04103; G06F 2203/04112; G09G 3/3644; G09G 3/3648
See application file for complete search history.

(56) References Cited

U.S. PATENT DOCUMENTS

| 2008/0062140 A1* | 3/2008 | Hotelling et al. ............. 345/173 |
| 2008/0062148 A1* | 3/2008 | Hotelling et al. ............. 345/174 |
| 2012/0249943 A1* | 10/2012 | Pai ................. 349/141 |
| 2012/0307185 A1* | 12/2012 | Wang ............................ 349/106 |
| 2013/0341651 A1* | 12/2013 | Kim et al. ...................... 257/84 |

(Continued)

FOREIGN PATENT DOCUMENTS

| CN | 101866228 A | 10/2010 |
| CN | 102109690 A | 6/2011 |

(Continued)

OTHER PUBLICATIONS

First Chinese Office Action dated Aug. 15, 2014; Appln. No. 201210429474.9.

(Continued)

*Primary Examiner* — Joe H Cheng
(74) *Attorney, Agent, or Firm* — Ladas & Parry LLP

(57) ABSTRACT

Embodiments of the invention disclose a color filter substrate and a manufacturing method thereof, a display device with touch function and a driving method thereof. The color filter substrate comprises: a base substrate, a sense layer and a color filter layer disposed on the base substrate. The color filter layer includes a black matrix and a plurality of color filter patterns separated from each other by the black matrix. The sense layer and the color filter layer are disposed on a same side of the base substrate. The sense layer includes a plurality of sense regions, and a drive line and a sense line are provided side by side in a same layer in each of the sense regions.

13 Claims, 6 Drawing Sheets

(56) References Cited

U.S. PATENT DOCUMENTS

2014/0168154 A1* 6/2014 Wang et al. .................. 345/174
2014/0176491 A1* 6/2014 Zhao et al. ................... 345/174

FOREIGN PATENT DOCUMENTS

| CN | 102207656 | A | 10/2011 |
| CN | 102221755 | A | 10/2011 |
| CN | 102338945 | A | 2/2012 |
| CN | 202939388 | U | 5/2013 |

OTHER PUBLICATIONS

Second Chinese Office Action dated Dec. 31, 2014; Appln. No. 20120429474.9.

* cited by examiner

COLOR FILTER SUBSTRATE AND MANUFACTURING METHOD THEREOF, DISPLAY DEVICE WITH TOUCH FUNCTION AND DRIVING METHOD THEREOF

TECHNICAL FIELD

Embodiments of the invention relate to a color filter substrate and a manufacturing method thereof, a display device with touch function and a driving method thereof.

BACKGROUND

Recently, display device with touch function develops rapidly and has gradually become the most popular flat panel display. According to technical principles, the display device with touch function may be divided into five types: vector pressure type, resistance type, capacitance type, infrared ray type, and surface acoustic wave type. According to the structures, the display device with touch function may be divided into three types: add-on type, on-cell type, and in-cell type.

The display device with touch function of the capacitance type comprises drive lines and sense lines intersecting with each other and separated from each other by an insulating layer. When a finger (or other object) approaches or touches the display device with touch function, the capacitance between the drive line and sense line intersecting with each other in the vicinity of the touch point is changed, and the position of the touch point can be determined based on the changed capacitance between the drive line and the sense line.

The structure of the above drive lines and sense lines is complicated. In order to increase the yield of production, the conventional on-cell capacitive display device with touch function is manufactured by the following steps. Firstly, the drive lines and the sense lines are formed on the front surface of a base substrate of the color filter substrate. Then, the base substrate is turned over after the formation of the drive lines and the sense lines, and a black matrix and color filter patterns are formed on the back surface of the base substrate. However, the turning over process and the subsequent manufacturing process will greatly reduce the yield of production. In addition, because the drive lines and the sense lines are formed on the front surface of the base substrate, the base substrate can not be thinned from its front surface. resulting in a thicker product.

SUMMARY

According one aspect of the invention, there is provided a color filter substrate. The color filter substrate comprises: a base substrate, a sense layer and a color filter layer disposed on the base substrate. The color filter layer includes a black matrix and a plurality of color filter patterns separated from each other by the black matrix. The sense layer and the color filter layer are disposed on a same side of the base substrate. The sense layer includes a plurality of sense regions, and a drive line and a sense line are provided side by side in a same layer in each of the sense regions.

For example, the sense layer is disposed on the base substrate, and the color filter layer is disposed on the sense layer.

For example, the drive line and the sense line are disposed at positions provided with the black matrix.

For example, the drive line and the sense line are arranged side by side in the sense region in a convolution manner or in a zigzag manner.

For example, both the drive line and the sense line are a metal wire or a transparent conductive wire.

For example, both the drive line and the sense line include: a metal wire, and a transparent electrode provided along the metal wire, and the transparent electrode is connected to the metal wire.

For example, the transparent electrode is provided on the metal wire, or the transparent electrode is provided under the metal wire.

For example, the transparent electrode has a serrate edge; and the serrate edge of the transparent electrode of the drive line and the senate edge of the transparent electrode of the sense line are complementary to each other.

For example, the color filter substrate further comprises: a plurality of drive line leads and a plurality of sense line leads; the drive lines of the sense regions in a same row are all connected to a same drive line lead, and the sense lines of the sense regions in a same column are all connected to a same sense line lead.

For example, the drive line has a plurality of first branches, the sense line has a plurality of second branches, and the first branches of the drive line and the second branches of the sense line are arranged in an interdigitated manner.

According to another aspect of the invention, there is provided a display device with touch function. The display device with touch function comprises: a color filter substrate as described above; an array substrate, comprising a plurality of data lines, a plurality of gate lines, and a plurality of pixels defined by intersecting the plurality of data lines and the plurality of gate lines; and a liquid crystal layer sandwiched between the color filter substrate and the array substrate.

According to yet another aspect of the invention, there is provided a driving method for the display device with touch function as described above. The driving method comprises: stopping applying a drive signal to the drive line in a first period of a screen refresh cycle, and meanwhile sequentially outputting an ON signal from respective gate lines, so that the data lines sequentially apply a display data to respective pixels, wherein the screen refresh cycle is a period for displaying one frame of image and includes the first period and a second period; applying the drive signal to the drive line in the second period of the screen refresh cycle, receiving a touch signal by the sense line, and meanwhile outputting an OFF signal from respective gate lines.

For example, the first period is longer than the second period.

For example, the first period is set to 12.67 ms, and the second period is set to 4 ms.

For example, the second period is far less than 0.1 s.

According to still a further aspect of the invention, there is provided a manufacturing method of a color filter substrate. The method comprises: forming a plurality of sense regions, in each of which a drive line and a sense line are provided, on a base substrate so as to form a sense layer; and forming a black matrix and color filter patterns so as to form a color filter layer.

BRIEF DESCRIPTION OF THE DRAWINGS

In order to clearly illustrate the technical solution of the embodiments of the present invention, a brief introduction of the drawings of the embodiments shall be given hereinafter. apparently, the drawings described as follows only relate to some embodiments of the present invention. but do not limit the present invention.

DETAILED DESCRIPTION

In order to make the object, technical solution and advantages of the embodiments of the present invention clearer, the technical solution in the embodiments of the present invention shall be clearly and completely described hereinafter in conjunction with the accompanying drawings. Obviously, the described embodiments are part of rather than all of the embodiments of the present invention. Based on the embodiments of the present invention, all the other embodiments that a person ordinarily skilled in the art obtains without inventive effort are within the scope of the present invention.

Embodiments of the invention provide a color filter substrate and a manufacturing, method thereof, a display device with touch function and a driving method thereof, which are capable of improving the yield of production and making the product thinner.

The display device with touch function may be any products or components with touch and display functions, such as LCD panel, e-paper, OLED panel, mobile phone, pad, television, monitor, notebook PC, digital picture frame, navigator, etc., which have touch function.

Embodiment 1

Figure 1:
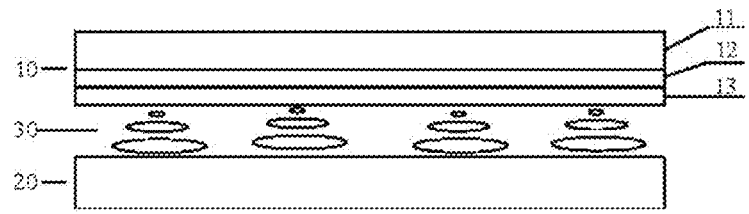
FIG. 1 is a sectional view illustrating a display device with touch function and a color filter substrate according to Embodiment 1 of the invention.
Figure 2:
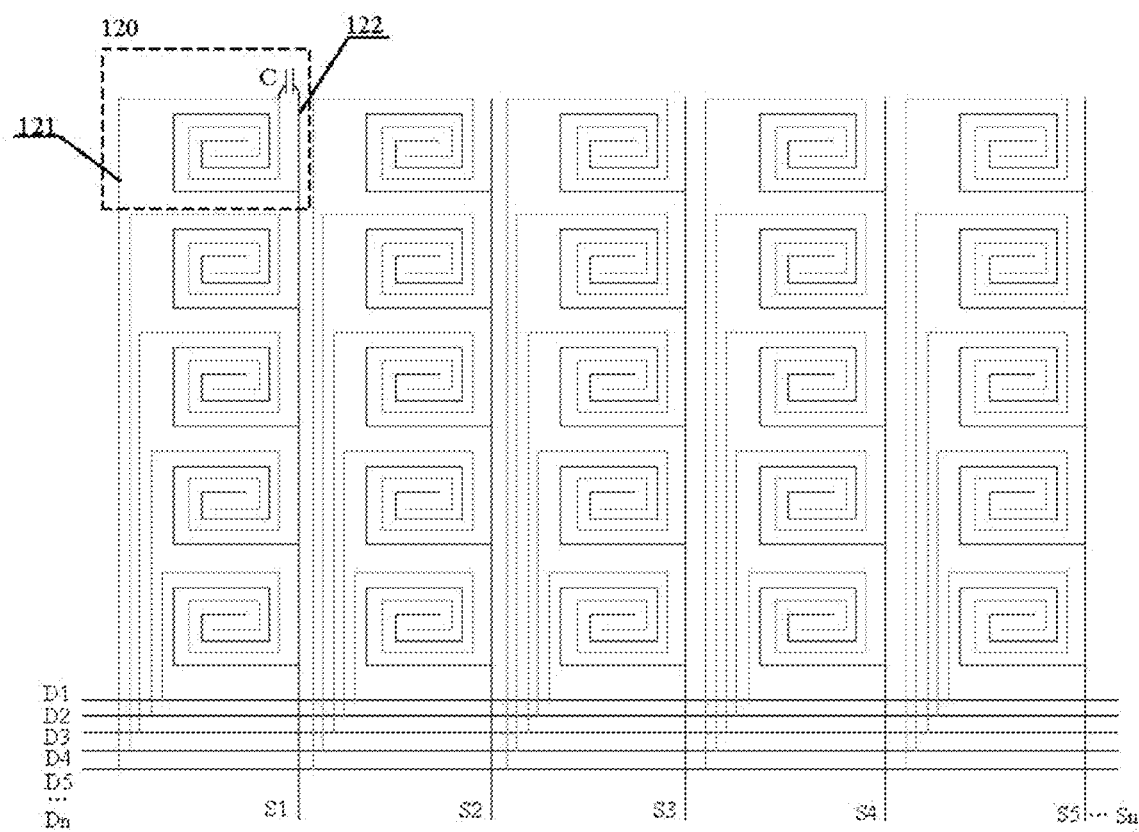
FIG. 2 is a schematic diagram illustrating an arrangement manner of a sense line and a drive line in a sense layer according to Embodiment 1 of the invention.

This embodiment provides a color filter substrate 10. Referring to FIG. 1 and FIG. 2, the color filter substrate 10 comprises: a base substrate 11, a sense layer 12 and a color filter layer 13 disposed on the base substrate 11. The color filter layer 13 includes a black matrix and a plurality of color filter patterns separated from each other by the black matrix.

The sense layer 12 and the color filter layer 13 are disposed on a same side of the base substrate 11.

The sense layer 12 includes a plurality of sense regions 120, and a drive line 121 and a sense line 122 are provided side by side in a same layer in each of the sense regions 120.

The sense layer 12 according to this embodiment may be disposed above or below the color filter layer 13. Preferably, the sense layer 12 is disposed on the base substrate 11, and the color filter layer 13 is disposed on the sense layer 12.

In the color filter substrate according to this embodiment, as shown in FIG. 2, the entire display region with touch function is divided into the plurality of sense regions 120, the drive line 121 and the sense line 122 are provided side by side in each of the sense regions 120, the drive line 121 and the sense line 122 are disposed in the same layer, and a mutual capacitance C is formed between the drive line 121 and the sense line 122. When the display device with touch function is touched. the mutual capacitance C between the drive line 121 and the sense line 122 in the touched region changes, which causes changes in current or pulse signal. In this way. the sense region 120 where the touch occurs is determined, and thus the horizontal and vertical coordinates of the touched region is determined. The area of each sense region 120 and the number of the sense regions 120 may be determined according to the practical requirements. For example, the area of each sense region 120 and the number of the sense regions 120 may be designed based on the area of the contact region when the practical touch occurs, and they are not limited in the embodiment.

Figure 3:
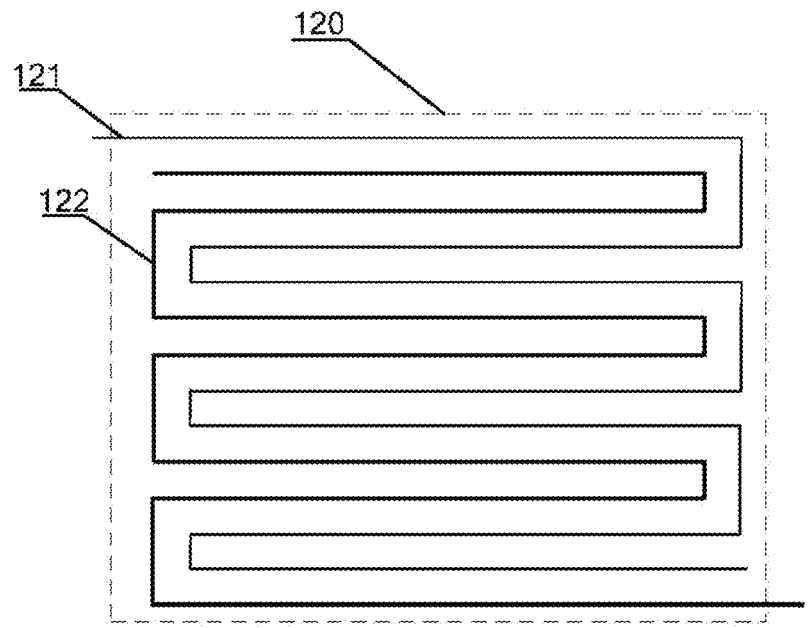
FIG. 3 is a schematic diagram illustrating another arrangement manner of the sense line and the drive line in the sense layer according to Embodiment 1 of the invention.

The drive line 121 and the sense line 122 may be arranged side by side in a convolution manner as shown in FIG. 2, or may be arranged side by side in a zigzag manner as shown in FIG. 3. In addition, the drive line 121 and the sense line 122 may be arranged in other manners, and the arrangement manners of the drive line 121 and the sense line 122 are not limited in this embodiment. When the drive line 121 and the sense line 122 are arranged side by side in the convolution manner, the mutual capacitance C between the drive line 121 and the sense line 122 can be increased, and thus the touch sensitivity can be enhanced.

In the color filter substrate according to the embodiment, the sense layer 12 includes the plurality of sense regions 120, and the drive line 121 and the sense line 122 are provided side by side in the same layer in each of the sense regions 120, and in this case, the sense layer 12 can be formed by a single patterning process and the manufacturing process can be simplified. Accordingly, the sense layer can be disposed on the inner side of the color filter substrate, that is, the sense layer and the color filter layer can be disposed on the same side of the color filter substrate, thus it is not necessary to performing the turning over process, the yield of production can be increased, and the color filter substrate can be thinned by a subsequent thinning process so as to make the resultant product thinner.

Furthermore, as shown in FIG. 2, the color filter substrate according to the embodiment further comprises: a plurality of drive line leads (D1~Dn) and a plurality of sense line leads (S1~Sn).

The drive lines 121 of the sense regions 120 in a same row are all connected to a same drive line lead (for example, one of D1~Dn), and the sense lines 122 of the sense regions 120 in a same column are all connected to a same sense line lead (for example, one of S1~Sn).

In this embodiment, the above connections between the drive line and the drive line lead and between the sense line and the sense line lead can achieve the detection of the mutual capacitance. For example, a touch signal received by the drive line 121 and the sense line 122 is transmitted to a sensor via the drive line lead and the sense line lead, and the sensor determines the touched sense region 120 so that the addressing of the touched sense region 120 is achieved. For example, the sensor is provided on an array substrate that is opposite to the color filter substrate 10 according to the embodiment.

The embodiment further provides a display device with touch function. The display device with touch function comprises: the color filter substrate 10 as described above, an array substrate 20, and a liquid crystal layer 30 sandwiched between the color filter substrate 10 and the array substrate 20. The display function of the display device with touch function may be implemented in a vertical electric field mode or in a horizontal electric field mode. For example, the array substrate 20 comprises a plurality of data lines, a plurality of gate lines, and a plurality of pixels defined by intersecting the plurality of data lines and the plurality of gate lines.

In the display device with touch function according to the embodiment, the sense layer can be formed by a single patterning process and the manufacturing process can be simplified. Accordingly, the sense layer can be disposed on the inner side of the color filter substrate, thus it is not necessary to performing the turning over process, the yield of production can be increased, and the color filter substrate can be thinned by a subsequent thinning process so as to make the resultant product thinner.

Embodiment 2

Figure 4:
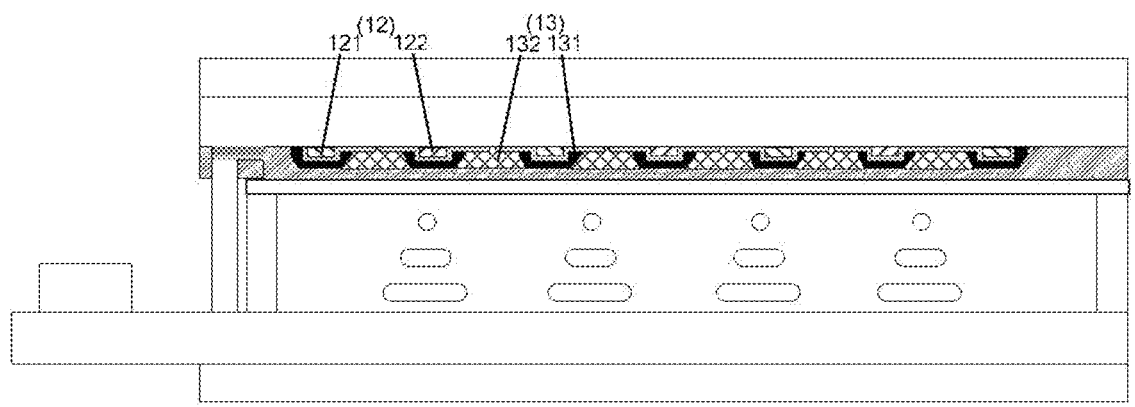
FIG. 4 is a sectional view illustrating a color filter substrate according to Embodiment 2 of the invention.
Figure 5:
FIG. 5 is a planar view illustrating the color filter substrate according to Embodiment 2 of the invention.

This embodiment also provides the color filter substrate. In the color filter substrate according to this embodiment, as shown in FIG. 4 and FIG. 5, the color filter layer 13 includes the black matrix 131 and the plurality of color filter patterns 132 separated from each other by the black matrix 131, and the drive line 121 and the sense line 122 of the sense region 120 are disposed at positions provided with the black matrix 131 so that they are blocked by the black matrix 131.

The color filter patterns 132 of the color filter layer 13 are of different colors (e.g., R, G and B), and each of the color filter patterns 132 is surrounded by the black matrix 131 that is capable of shielding light. The sense layer 12 may be disposed below the color filter layer 13. or may be disposed above the color filter layer 13. The drive line 121 and the sense line 122 of the sense layer 12 are provided at the positions provided with the black matrix 131 so that the aperture ratio can be increased. As shown in FIG. 5, the drive line 121 and the sense line 122 are provided side by side at positions provided with black matrix 131 in the convolution manner, so that the black matrix 131 blocks the drive line 121 and the sense line 122 and the aperture ratio is not adversely influence by the drive line 121 and the sense line 122.

For example, both the drive line and the sense line are a metal wire or a transparent conductive wire. The metal wire has good conductivity and small impedance, but generally is opaque. The transparent conductive wire, such as wire formed of ITO, is transparent, but has poor conductivity and large impedance.

Figure 6:
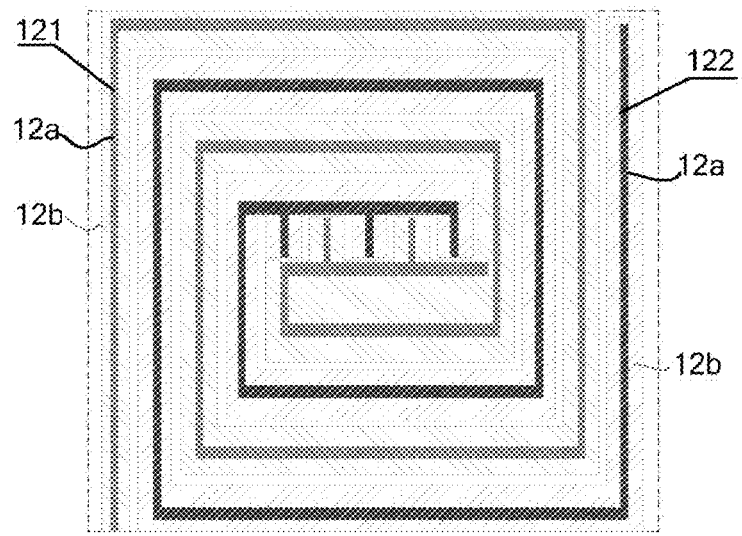
FIG. 6 is a schematic diagram illustrating a sense line and a drive line in a sense layer according to Embodiment 2 of the invention.

For example, as shown in FIG. 6, both the drive line 121 and the sense line 122 in the embodiment include: a metal wire 12a, and a transparent electrode 12b provided along the metal wire, and the transparent electrode 12b is connected to the metal wire 12a.

In order to decrease the impedance of the drive line 121 and/or the sense line 122, each of or one of the drive line 121 and the sense line 122 includes the metal wire 12a and the transparent electrode 12b in the embodiment. Accordingly, the impedance of the drive line and/or the sense line can be decreased, and the mutual capacitance can be increased so that the touch sensitivity can be enhanced without adversely affecting the aperture ratio.

The transparent electrode 12b may be provided on the metal wire 12a, or may be provided under the metal wire 12a. When the transparent electrode 12b is provided on the metal wire 12a, the transparent electrode 12b can protect the metal wire 12a and prevent the metal wire 12a from breaking in subsequent manufacturing processes (e.g., the manufacturing processes of the black matrix and the color filter patterns). When the transparent electrode 12b is provided under the metal wire 12a, the transparent electrode 12b and the metal wire 12a can be formed by a single patterning process. The positional relationship between the transparent electrode 12b and the metal wire 12a can be designed according to the practical requirements.

Figure 7:
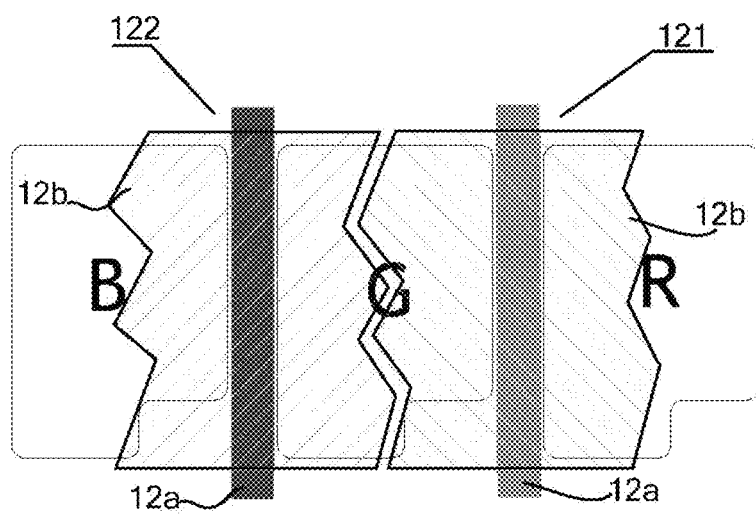
FIG. 7 is a schematic diagram illustrating the sense line and the drive line in the sense layer according to Embodiment 2 of the invention.

Further, as shown in FIG. 7, the transparent electrode 12b has a serrate edge, and the serrate edge of the transparent electrode of the drive line 121 and the serrate edge of the transparent electrode of the sense line 122 are complementary to each other.

In the case that the transparent electrode 12b has the serrate edge and the serrate edge of the transparent electrode of the drive line 121 and the serrate edge of the transparent electrode of the sense line 122 are complementary to each other, the area in which the transparent electrode of the drive line 121 and the transparent electrode of the sense line 122 are opposite to each other can be increased. Thereby, the mutual capacitance C between the drive line 121 and the sense line 122 can be increased so that the touch sensitivity can be enhanced.

In addition, as shown in FIG. 6, the drive line 121 has a plurality of first branches, the sense line 122 has a plurality of second branches, and the first branches of the drive line 121 and the second branches of the sense line 122 are arranged in an interdigitated manner. In this way, the mutual capacitance C between the drive line 121 and the sense line 122 can be further increased so that the touch sensitivity can be further enhanced.

The embodiment further provides a display device with touch function. The display device with touch function comprises the color filter substrate as described above.

In the display device with touch function according to the embodiment, the drive line and the sense line are blocked by the black matrix, and thus the aperture ratio can be increased. In addition, the manufacturing process can be simplified, it is not necessary to performing the turning over process, the yield of production can be increased, and the color filter substrate can be thinned by a subsequent thinning process so as to make the resultant product thinner.

Embodiment 3

This embodiment provides a manufacturing method of a color filter substrate. The method comprises the following steps.

Step 101: forming a plurality of sense regions, in each of which a drive line and a sense line are provided, on a base substrate so as to form a sense layer;

Referring to FIG. 2, the sense layer includes the plurality of sense regions 120 in the entire display region with touch function, the drive line 121 and the sense line 122 are provided side by side in each of the sense regions 120. The arrangement manners of the drive line 121 and the sense line 122 are not limited in this embodiment.

For example, both the drive line and the sense line are disposed at positions provided with a black matrix to be formed.

For example, both the drive line and the sense line are a metal wire or a transparent conductive wire.

For example, both the drive line and the sense line include: a metal wire, and a transparent electrode provided along the metal wire, and the transparent electrode is connected to the metal wire.

Step 102: forming a black matrix and color filter patterns so as to form a color filter layer.

Figure 8:
FIG. 8 is a schematic diagram illustrating a color filter substrate after a black matrix is formed according to Embodiment 3 of the invention.

After the drive line 121 and the sense line 122 are formed, the base substrate is not turned over. In this step, the black matrix 131 is formed on the sense layer to cover the drive line and the sense line, as shown in FIG. 8. Then, the color filter patterns 132 of different colors (e.g., R, G and B) are formed, as shown in FIG. 5.

Next, the manufacturing of the color filter substrate is completed according to the normal procedure. If the vertical electric field mode is adopted, a common electrode and an alignment layer are further formed. If the horizontal electric field mode is adopted, it is unnecessary to form the common electrode on the color filter substrate, and the common electrode is provided on the array substrate.

In addition, it should be noted that the sense layer may be disposed above or below the color filter layer (including the black matrix and color filter patterns). Therefore, the step 101 for forming the drive line and the sense line and the step 102 for forming the black matrix and color filter patterns are interchangeable, the order of performing the step 101 and the step 102 is not affect the technical effects achieved by the embodiment of the invention and thus is not limited in the embodiment of the invention.

In the manufacturing method of the color filter substrate according to the invention, the drive line and the sense line are firstly formed on the inner side of the base substrate of the color filter substrate to form the sense layer, then without the turning over process of the base substrate, the black matrix and color filter patterns are directly formed on the sense layer to form the color filter layer. Accordingly, the manufacturing process can be simplified, the aperture ratio can be increased, the yield of production can be increased, and the color filter substrate can be thinned by a subsequent thinning process so as to make the resultant product thinner.

For example, the step 101 may be performed as follows.

Step 1011: Depositing a metal layer on the base substrate, and forming the metal wire at positions where the black matrix to be formed by using a patterning process. The metal wire includes the metal wire of the drive line and the metal wire of the sense line.

Step 1012: Depositing a transparent conductive layer, and forming the transparent electrode provided long the metal wire by using a patterning process. The transparent electrode includes the transparent electrode of the drive line and the transparent electrode of the sense line.

The transparent electrode may be formed of one or more of indium tin oxide, indium zinc oxide, and aluminum zinc oxide.

In this embodiment, the step 1012 may be performed firstly, that is, the transparent electrode is firstly formed at positions where the black matrix to be formed. Then, the step 1011 is performed, that is, the metal wire is formed along the transparent electrode. As a result, the metal wire is disposed above the transparent electrode.

In the embodiment, the drive line and the sense line includes the metal wire and the transparent electrode. Accordingly, the impedance of the drive line and the sense line can be decreased, and the touch sensitivity can be enhanced without adversely affecting the aperture ratio.

In the manufacturing method of the color filter substrate according to the embodiment, it is not necessary to perform the turning over process of the base substrate, the manufacturing process can be simplified, the yield of production can be increased, and the color filter substrate can be thinned by a subsequent thinning process so as to make the resultant product thinner.

Embodiment 4

Figure 9:
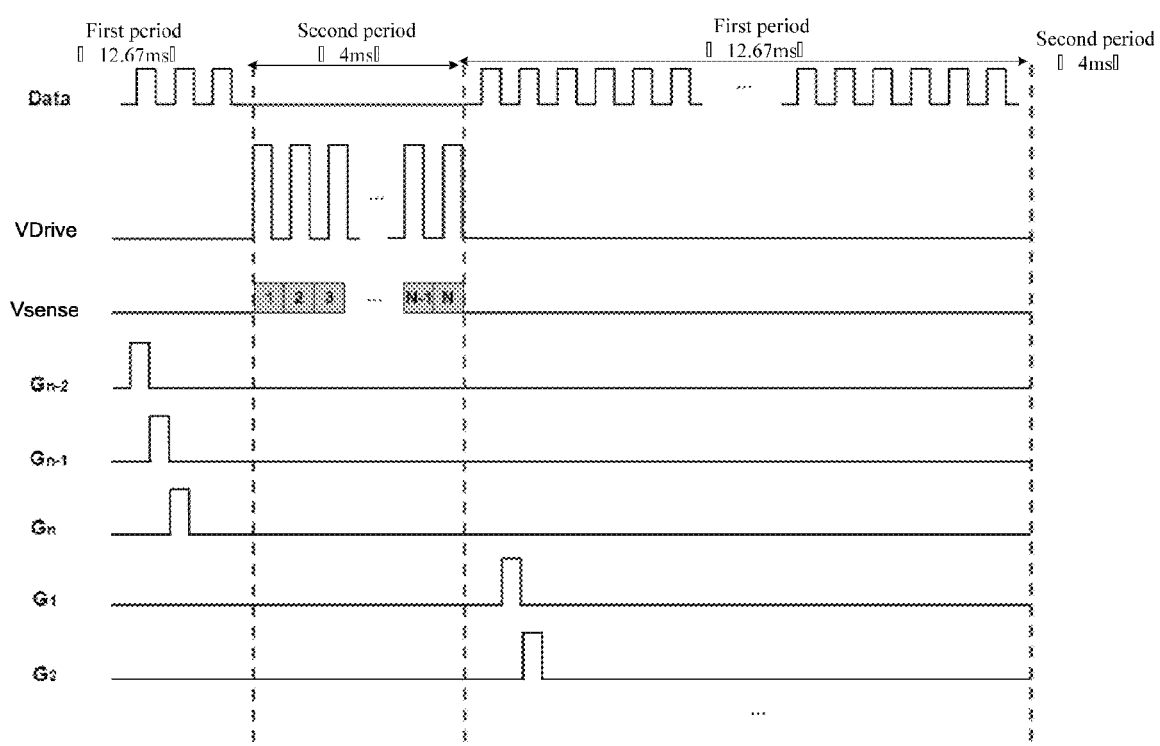
FIG. 9 is schematic diagram illustrating a driving method of the display device with touch function according to Embodiment 4 of the invention.

This embodiment provides a driving method of a display device with touch function. As shown in FIG. 9, the method comprises the following steps.

201: Stopping applying a drive signal to the drive line in a first period (that is, a display period) of a screen refresh cycle, and meanwhile sequentially outputting an ON signal from respective gate lines, so that the data lines sequentially apply a display data to respective pixels, wherein the screen refresh cycle includes the first period and a second period;

202: Applying the drive signal to the drive line in the second period (that is, a touch period) of the screen refresh cycle, receiving a touch signal by the sense line, and meanwhile outputting an OFF signal from respective gate lines.

In this method, the screen refresh cycle is a period for displaying one frame of image and is divided into the first period and the second period, as shown in FIG. 11. A refresh rate of a normal display device is 60 Hz, that is, the screen refresh cycle (the period for displaying one frame of image) is about 16.67 ms. For example, the first period, i.e., the display period, is set to 12.67 ms; and the second period, i.e., the touch period, is set to 4 ms.

In the first period (in the period of 12.7 ms within one frame), the drive line is not provided with signal (that is, the drive line in an OFF state), and the sense line stops receiving signal; meanwhile the respective gate lines start to output the ON signal sequentially so that the pixels are provided with the display data row and row and each of the pixels is charged to a desired voltage. In this way, the display device with touch function displays an image.

In the second period (the remaining period within one frame), the drive signal is applied to the drive line. At this time, if the display device with touch function is touched, the touch signal is generated and is inputted to a CPU via the drive line and the sense line, and the CPU performs an analysis on the touch signal and outputs corresponding results. In addition, in the second period, although the respective gate lines output the OFF signal so that the thin-film transistor in each of the pixels is turned off, the image displayed on the display device with touch function in the second period maintains its state in the first period because each of the pixels has been charged to the desired voltage in the first period.

In the driving method of the display device with touch function according to the embodiment, only in the second period, the drive signal is applied to the drive line and the sense line receives the touch signal. In addition, because the second period is very short and is far less than the average human response time of 0.1 s, the second period will not affect the display effect of the display device with touch function.

In the driving method of the display device with touch function according to the embodiment, the display function and the touch function of the display device with touch function are driven in different periods. When the drive signal is applied to the drive line and the touch signal is received by the sense line, the image displayed by the display device with touch function still maintains its state in the first period because each of the pixels has been charged to the desired voltage, and thus the display effect is not be affected by the touch function.

The foregoing are only preferable embodiments of the invention. It is to be noted that, those with ordinary skills in the art may make various modifications and changes without departing the technical principle of the invention, and these modifications and changes should be deemed to be within the protection scope of the invention.

What is claimed is:

1. A color filter substrate, comprising: a base substrate, a sense layer and a color filter layer disposed on the base substrate, wherein
the color filter layer includes a black matrix and a plurality of color filter patterns separated from each other by the black matrix,
the sense layer and the color filter layer are disposed on a same side of the base substrate;

the sense layer includes a plurality of sense regions, and a drive line and a sense line are provided side by side in a same layer in each of the sense regions; and the drive line and the sense line are arranged side by side in the sense region in a convolution manner or in a zigzag manner.

2. The color filter substrate according to claim 1, wherein the sense layer is disposed on the base substrate, and the color filter layer is disposed on the sense layer.

3. The color filter substrate according to claim 1, wherein the drive line and the sense line are disposed at positions provided with the black matrix.

4. The color filter substrate according to claim 1, wherein both the drive line and the sense line are a metal wire or a transparent conductive wire.

5. The color filter substrate according to claim 1, wherein both the drive line and the sense line include: a metal wire, and a transparent electrode provided along the metal wire, and the transparent electrode is connected to the metal wire.

6. The color filter substrate according to claim 5, wherein the transparent electrode is provided on the metal wire, or the transparent electrode is provided under the metal wire.

7. The color filter substrate according to claim 6, wherein the transparent electrode has a serrate edge; and the serrate edge of the transparent electrode of the drive line and the serrate edge of the transparent electrode of the sense line are complementary to each other.

8. The color filter substrate according to claim 1, further comprising: a plurality of drive line leads and a plurality of sense line leads;

the drive lines of the sense regions in a same row are all connected to a same drive line lead, and the sense lines of the sense regions in a same column are all connected to a same sense line lead.

9. The color filter substrate according to claim 1, wherein the drive line has a plurality of first branches, the sense line has a plurality of second branches, and the first branches of the drive line and the second branches of the sense line are arranged in an interdigitated manner.

10. A display device with touch function, comprising:

a color filter substrate according to claim 1;

an array substrate, comprising a plurality of data lines, a plurality of gate lines, and a plurality of pixels defined by intersecting the plurality of data lines and the plurality of gate lines; and a liquid crystal layer sandwiched between the color filter substrate and the array substrate.

11. A driving method of the display device with touch function according to claim 10, comprising:

stopping applying a drive signal to the drive line in a first period of a screen refresh cycle, and meanwhile sequentially outputting an ON signal from respective gate lines, so that the data lines sequentially apply a display data to respective pixels, wherein the screen refresh cycle is a period for displaying one frame of image and includes the first period and a second period;

applying the drive signal to the drive line in the second period of the screen refresh cycle, receiving a touch signal by the sense line, and meanwhile outputting an OFF signal from respective gate lines;

wherein the first period is set to 12.67 ms, and the second period is set to 4 ms.

12. The driving method according to claim 11, wherein the first period is longer than the second period.

13. The driving method according to claim 11, wherein the second period is far less than 0.1 s.

* * * * *